United States Patent
Liang et al.

(10) Patent No.: US 10,995,855 B2
(45) Date of Patent: May 4, 2021

(54) VEHICLE PARK LOCK ASSEMBLY WITH SUPPORT BLOCK AND SUPPORTING METHOD FOR VEHICLE PARK LOCK ASSEMBLY

(71) Applicant: Ford Global Technologies, LLC, Dearborn, MI (US)

(72) Inventors: Zheng Liang, Canton, MI (US); Emad Al-Regib, Westland, MI (US); Todd Curtis Spaulding, Ann Arbor, MI (US); Susan Wyatt, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 174 days.

(21) Appl. No.: 16/414,156

(22) Filed: May 16, 2019

(65) Prior Publication Data

US 2020/0362964 A1 Nov. 19, 2020

(51) Int. Cl.
*F16H 63/34* (2006.01)
*F16H 63/48* (2006.01)

(52) U.S. Cl.
CPC ..... *F16H 63/3425* (2013.01); *F16H 63/3483* (2013.01); *F16H 63/483* (2013.01)

(58) Field of Classification Search
CPC ............ F16H 63/3416; F16H 63/3425; F16H 63/3483; F16H 63/48; F16H 63/483; B60T 1/005
USPC ...................................................... 251/284
See application file for complete search history.

(56) References Cited

U.S. PATENT DOCUMENTS

| | | | |
|---|---|---|---|
| 3,912,050 A | * | 10/1975 | Iwanaga ................. B60T 1/005 188/69 |
| 6,481,556 B1 | | 11/2002 | Haupt |
| 10,041,591 B2 | | 8/2018 | Yasnogorodskiy et al. |
| 10,189,451 B2 | * | 1/2019 | Wyatt ..................... F16H 63/38 |
| 2007/0284213 A1 | | 12/2007 | Duhaime et al. |
| 2010/0108460 A1 | | 5/2010 | Nakamura et al. |
| 2011/0067962 A1 | | 3/2011 | Yonezu et al. |
| 2015/0025750 A1 | | 1/2015 | Weslati et al. |

(Continued)

FOREIGN PATENT DOCUMENTS

WO 2004031623 4/2004

*Primary Examiner* — Richard M Lorence
(74) *Attorney, Agent, or Firm* — David Kelley, Esq.; Carlson, Gaskey & Olds, P.C.

(57) ABSTRACT

A vehicle park lock assembly includes a park valve that moves in a first direction to transition a lever from a first to a second position, and moves in an opposite, second direction to permit movement of the lever from the second to the first position. The assembly includes a support block that limits movement of the park valve in the first direction. The assembly includes a biasing device coupled to the support block and the park valve. The biasing device biases the park valve to the first position. A method of supporting components of a vehicle park lock assembly includes moving a park valve in a first direction to transition a lever from a first to a second position, and moving the park valve in an opposite, second direction to permit movement of the lever from the second to the first position. The method also includes biasing the park valve to the first position with a biasing device that is coupled to the lever and a support block, and limiting movement of the park valve in the first direction using the support block.

18 Claims, 5 Drawing Sheets

(56) References Cited

U.S. PATENT DOCUMENTS

| | | |
|---|---|---|
| 2015/0316143 A1 | 11/2015 | Deurloo et al. |
| 2017/0001604 A1* | 1/2017 | Al-Regib ................ B60T 1/062 |
| 2017/0203738 A1* | 7/2017 | Wyatt ..................... F16D 65/14 |
| 2018/0156333 A1* | 6/2018 | Al-Regib ............ F16H 63/3416 |

* cited by examiner

VEHICLE PARK LOCK ASSEMBLY WITH SUPPORT BLOCK AND SUPPORTING METHOD FOR VEHICLE PARK LOCK ASSEMBLY

TECHNICAL FIELD

This disclosure relates generally to a support block of a vehicle park lock assembly and, more particularly, to a support block used to limit travel of a park valve while also at least partially supporting a biasing device of the vehicle park lock assembly.

BACKGROUND

In general, electrified vehicles differ from conventional vehicles because electrified vehicles can be selectively driven using one or more electric machines powered by a traction battery. An internal combustion engine of a conventional vehicle can generate drive torque to propel the conventional vehicle. An internal combustion engine, an electric machine, or both, can generate drive torque to propel an electrified vehicle. Example electrified vehicles can include hybrid electrified vehicles (HEVs), plug-in hybrid electrified vehicles (PHEVs), fuel cell vehicles (FCVs), and battery electric vehicles (BEVs).

Both conventional and electrified vehicles can include a transmission system that, among other things, transfers drive torque to vehicle drive wheels. The transmission system can be automatic. In automatic transmission systems, electrical components can be used in place of mechanical components. Such automatic transmission systems are often referred to as "shift-by-wire" transmissions.

Vehicles equipped with automatic transmission systems can include a vehicle park lock assembly. The vehicle park lock assembly can transition between a PARK position, which blocks movement of the vehicle, and an OUT-OF-PARK position, which permits movement of the vehicle. A "park-by-wire" park lock assembly can include at least some electrical components in place of mechanical components.

SUMMARY

A vehicle park lock assembly according to an exemplary aspect of the present disclosure includes, among other things, a park valve that moves in a first direction to transition a lever from a first to a second position, and moves in an opposite, second direction to permit movement of the lever from the second to the first position. The assembly includes a support block that limits movement of the park valve in the first direction. The assembly includes a biasing device coupled to the support block and the park valve. The biasing device biases the park valve to the first position.

In another embodiment of the foregoing assembly, the support block is secured directly to a transmission case.

Another embodiment of any of the foregoing assemblies includes a sensor restrained by the support block.

In another embodiment of any of the foregoing assemblies, the sensor is configured to sense whether the lever is in the first or the second position.

In another embodiment of any of the foregoing assemblies, the sensor is a transmission range sensor.

In another embodiment of any of the foregoing assemblies, transitioning the lever from the first to the second position causes a transmission system to transition from a PARK position to an OUT-OF-PARK position.

In another embodiment of any of the foregoing assemblies, transitioning the lever from the second to the first position causes a transmission system to transition from the OUT-OF-PARK position to the PARK position.

In another embodiment of any of the foregoing assemblies, the transmission system includes a pawl that is engaged with a gear to restrict vehicle motion when the transmission system is in the PARK position. The pawl is disengaged from the gear to permit vehicle motion when the transmission system is in the OUT-OF-PARK position.

Another embodiment of any of the foregoing assemblies includes a sensor coupled directly to the support block. The sensor is configured to sense whether the lever is in the first or the second position. The support block is secured directly to a transmission component.

In another embodiment of any of the foregoing assemblies, the support block provides a reaction point for the biasing device.

In another embodiment of any of the foregoing assemblies, the biasing device is a spring having a first end portion directly coupled to the lever and an opposite, second end portion directly coupled to the support block.

A method of supporting components of a vehicle park lock assembly according to another exemplary aspect of the present disclosure includes moving a park valve in a first direction to transition a lever from a first to a second position, and moving the park valve in an opposite, second direction to permit the lever to transition from the second to the first position. The method also includes biasing the park valve to the first position with a biasing device that is coupled to the lever and a support block, and limiting movement of the park valve in the first direction using the support block.

Another embodiment of the foregoing method includes extending the park valve in the first direction to rotate the lever from the first to the second position, and retracting the park valve in the second direction to permit the lever to rotate from the second to the first position.

Another embodiment of any of the foregoing methods includes rotating the lever from the second position to the first position using the park valve, the biasing device, or both.

In another embodiment of any of the foregoing methods, the support block restricts extending of the park valve to when limiting movement to the park valve in the first direction.

Another embodiment of any of the foregoing methods includes restraining a sensor with the support block. The sensor senses whether the lever is in the first or the second position.

Another embodiment of any of the foregoing methods includes directly attaching the support block to a transmission component.

In another embodiment of any of the foregoing methods, the biasing device is a spring having a first end portion coupled to the lever and an opposite, second end portion coupled to the support block. The support block provides a reaction point for the spring.

Another embodiment of any of the foregoing methods includes transitioning the lever from the first to the second position to move a transmission system from a PARK position to an OUT-OF-PARK position, and transitioning the lever from the second to the first position to move the transmission system from the OUT-OF-PARK position to the PARK position.

In another embodiment of any of the foregoing methods, the transmission system includes a pawl that is engaged with a gear to restrict vehicle motion when the transmission system is in the PARK position. The pawl is disengaged from the gear to permit vehicle motion when the transmission system is in the OUT-OF-PARK position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to a support block of a vehicle park lock assembly. The support block can be used to limit movement of a park valve. The support block can further help to secure a biasing device of the park lock assembly, and can provide a reaction point for the biasing device. In some examples, the support block helps to restrain a sensor of the park lock assembly, such as a transmission range sensor.

The support block thus provides multiple functions, which, in the past, required a plurality of separate and distinct components. Utilizing the support block for multiple functions can, among other things, reduce complexity of the vehicle park lock assembly.

Figure 1:
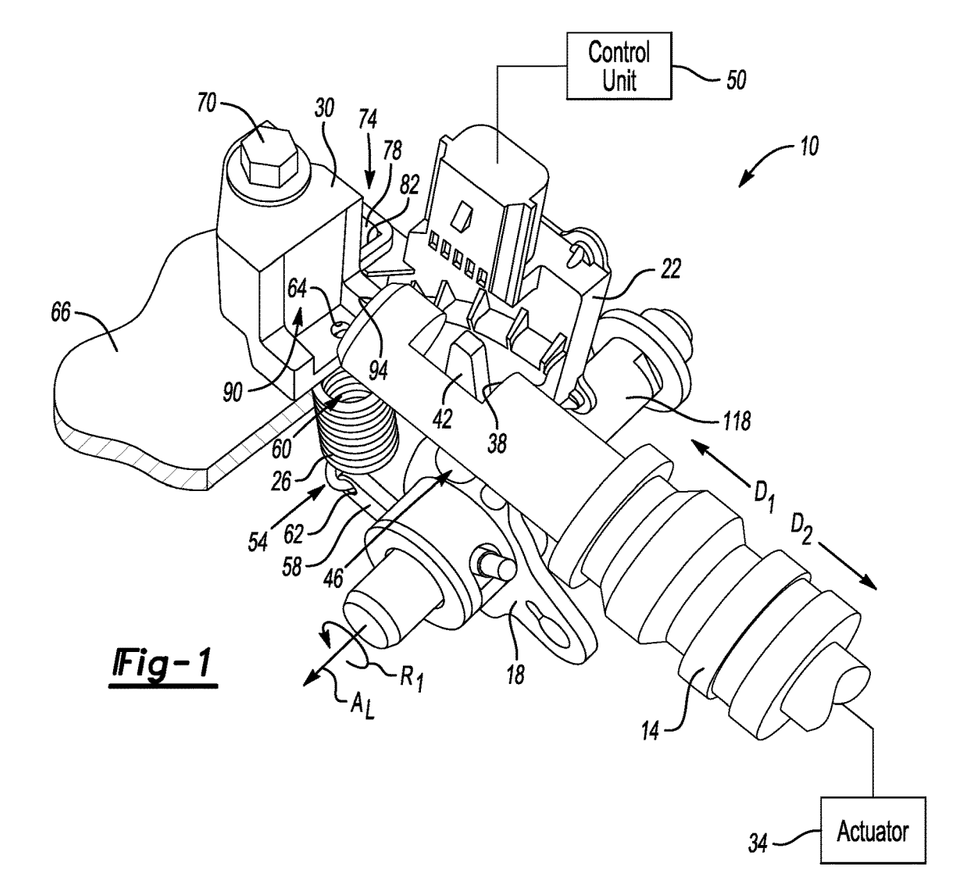
FIG. 1 illustrates a partially perspective and partially schematic view of selected components of a vehicle park lock assembly.

With reference to FIG. 1, a vehicle park lock assembly 10 includes a park valve 14, a lever 18, a sensor 22, a biasing device 26, and a support block 30. The vehicle park lock assembly 10 is used to selectively apply a park lock to an electrified vehicle in this embodiment. In other embodiments, the vehicle park lock assembly 10 could be used to selectively apply a park lock to another type of vehicle, such as a conventional vehicle.

The park valve 14 is extendable in a first direction $D_1$ and is retractable in an opposite, second direction $D_2$. In this example, an actuator 34 is used to extend the park valve 14 in the first direction $D_1$ and to retract the park valve 14 in the direction $D_2$. The actuator 34 can be a hydraulic actuator. In other embodiments, other types of actuators could be used.

The park valve 14 includes an aperture 38 that receives a finger 42 of the lever 18. When the park valve 14 is extended in the first direction $D_1$, the park valve 14 presses against the finger 42, which causes the lever 18 to rotate in a direction $R_1$ about a lever axis $A_L$.

In the exemplary embodiment, extension of the park valve 14 in the first direction $D_1$ rotates the lever 18 in a direction $R_1$ to transition the lever 18 from the first position shown in FIG. 1 to a second position. Although, the exemplary park valve 14 extends and retracts along an axis, the park valve 14, in another example, could rotate to transition the lever 18 to the second position.

The lever 18 includes a magnetized portion 46. When the lever 18 is rotated in the direction $R_1$, the magnetized portion 46 is moved relative to the sensor 22. The sensor 22, in the exemplary embodiment, detects the position of the lever 18 based on the position of the magnetized portion 46. The sensor 22 can detect the position of the magnetized portion based on, for example, a strength of a magnetic field emanating from the magnetized portion. The sensor 22 can thus detect whether the lever 14 is in the first position shown in FIG. 1 or in another position, such as the second position.

The sensor 22 can communicate signals to a control unit 50. The signals provide the control unit 50 with an input indicting whether the lever 18 is in the first position or another position. The control unit 50, in the exemplary embodiment, is a powertrain control module of the vehicle.

In the exemplary embodiment, the biasing device 26 is a spring, and more particularly a coil spring. The biasing device includes a first end portion 54 directly coupled to a flange 58 of the lever 18. A second end portion 60 of the biasing device 26 is directly coupled to the support block 30.

The biasing device 26 biases the lever 18 to the first position of FIG. 1. To rotate the lever 18 from the first position, the park valve 14 extends in the direction $D_1$ and applies a force to the finger 42. The applied force is sufficient to overcome the biasing force applied to the lever 18 by the biasing device 26.

When the park valve 14 is retracted back in the direction $D_2$ to the position of FIG. 1, the force applied to the finger 42 by the park valve 14 is reduced. The biasing force applied to the lever 18 by the biasing device 26 can ensure that the lever 18 is rotated in a direction opposite the direction $R_1$ back to the first position shown in FIG. 1. In some examples, the park valve 14 may contact the lever 18 when retracting to help move the lever 18 from the second position back to the first position.

The first end portion 54 of the biasing device 26 includes a hook that extends through an aperture 62 in the flange 58 to couple the biasing device 26 to the lever 18. The second end portion 60 of the biasing device 26 includes a hook that extends through an aperture 64 in the support block 30 to couple the biasing device 26 to the support block 30.

When the lever 18 is rotated from the first position of FIG. 1, the support block 30 remains stationary relative to the lever 18. The support block 30 thus provides a reaction point or anchor for the biasing device 26.

To secure the support block 30 relative to the lever 18 and other portions of the vehicle park lock assembly 10, the support block 30 can be directly coupled to a transmission case 66 of the vehicle. A mechanical fastener such as a bolt 70 can extend through an aperture in the support block 30 and threadably engage a bore in the transmission case 66 to secure the support block 30 to the transmission case.

An alignment assembly 74 can be incorporated within the sensor 22 and the support block 30 to help maintain a position of the sensor 22 relative to the support block 30 and other components of the vehicle park lock assembly. As can be appreciated, controlling the position of the sensor 22 can be important due to the sensor 22 being used to detect a position of the lever 18. In this example, the alignment assembly includes a tab 78 of the sensor 22 that extends through an aperture 82 within the support block 30. The tab 78 being received within the aperture 82 helps to limit movement, particularly rotational movement, of the sensor 22 relative to the support block 30 and other components of the park lock assembly 10. In another example, the alignment assembly 74 could include a tab of the support block 30 received within an aperture of the sensor 22 to limit relative movement therebetween.

In addition to the exemplary support block 30 providing a reaction point for the biasing device 26 and facilitating alignment of the sensor 22, the support block 30 further limits movement of the park valve 14. In particular, the support block 30 includes a surface 90 that can contact a terminal surface 94 of the park valve 14 when the park valve 14 is extended in the direction $D_1$. The surface 90 of the support block 30 contacts the terminal surface 94 to limit movement of the park valve 14 in the direction $D_1$.

The park valve 14 can be housed within a bore of a valve body (not shown) of the actuator 34. The valve body can restrict movement of the park valve 14 in the in the direction $D_2$. Limiting movement of the park valve 14 in the direction $D_1$ can prevent the park valve 14 from dropping out of the valve body due to hydraulic pressure, for example.

Figure 2:
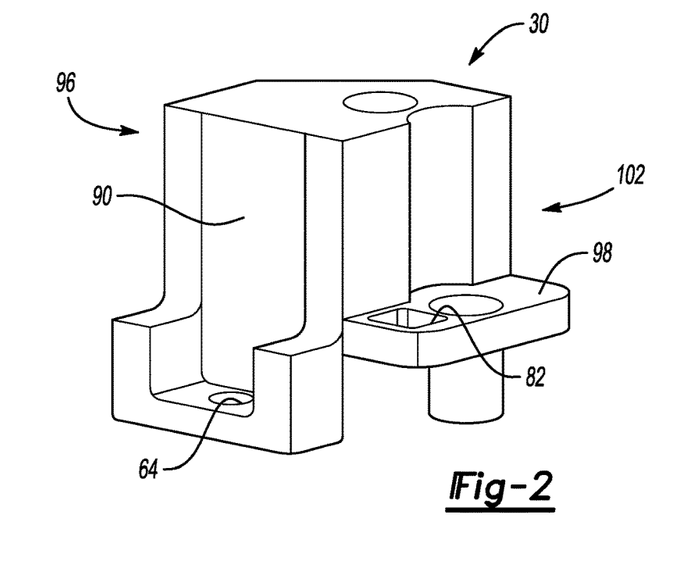
FIG. 2 illustrates a perspective view of a support block from the vehicle park lock assembly of FIG. 1.

With reference to FIG. 2, the support block 30 includes the surface 90 on a first side 96 of the support block 30. The area of the support block 30 that engages the second end portion 60 of the biasing device 26 is also disposed on the first side 96. The support block 30 includes a tab 98 extending generally from a second side 102 of the support block 30. The tab 98 provides the aperture 82 configured to receive the tab 78 of the sensor 22. The first side 96 is transverse to the second side 102 in the exemplary embodiment.

The support block 30 can be a metal or metal alloy material. In a specific embodiment, the powder metal technology can be utilized to provide the support block 30.

With reference now to FIGS. 3-6, the park lock assembly 10 can comprise, or otherwise be associated with, a transmission system 106. In the exemplary embodiment, the transmission system 106 includes, among other things, a pawl 110 and a gear 114. The gear 114 is rotatably coupled to an axle 116, which, when rotated, rotates at least one vehicle drive wheel.

Figure 3:
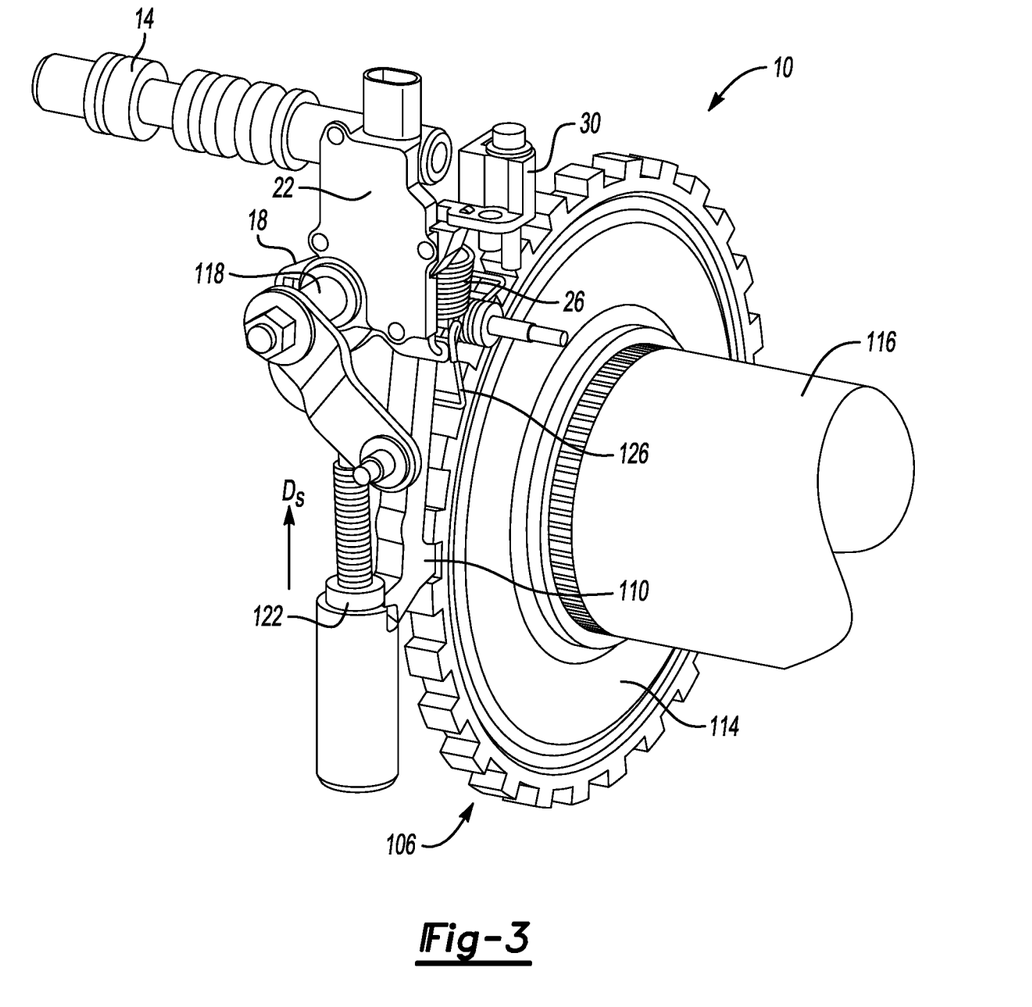
FIG. 3 illustrates a perspective view of selected components of the vehicle park lock assembly of FIG. 1 when in a PARK position.
Figure 4:
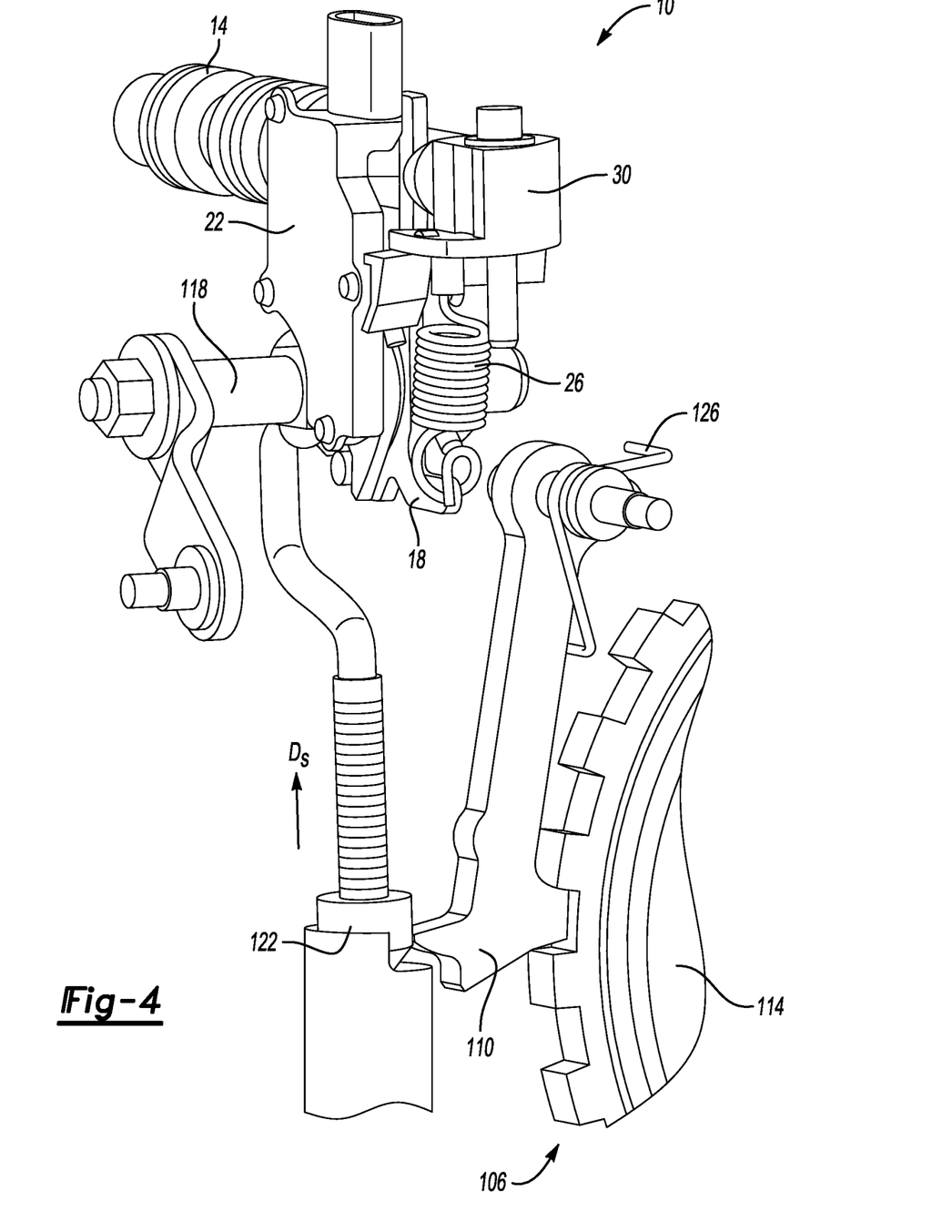
FIG. 4 illustrates another perspective view of selected portions of FIG. 3.

When the pawl 110 is engaged with the gear 114 as shown in FIGS. 3 and 4, rotation of the gear 114 is limited thereby restricting vehicle motion by restricting rotation of the axle 116. The transmission system 106 is in a PARK position when the pawl 110 is engaged with the gear 114 to restrict vehicle motion.

Figure 5:
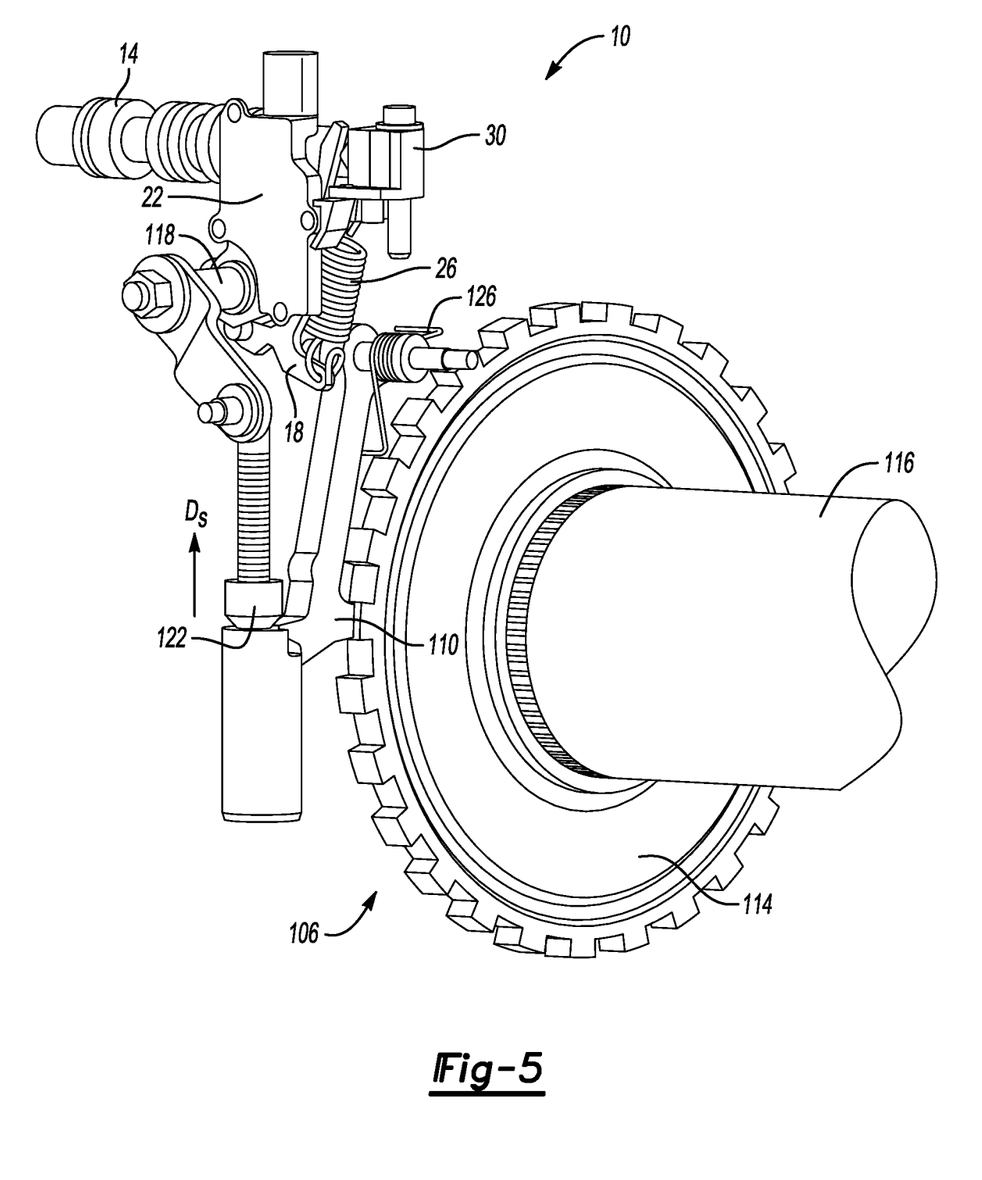
FIG. 5 illustrates the selected components of the vehicle park lock assembly of FIG. 3 when the vehicle park lock assembly is in an OUT-OF-PARK position.
Figure 6:
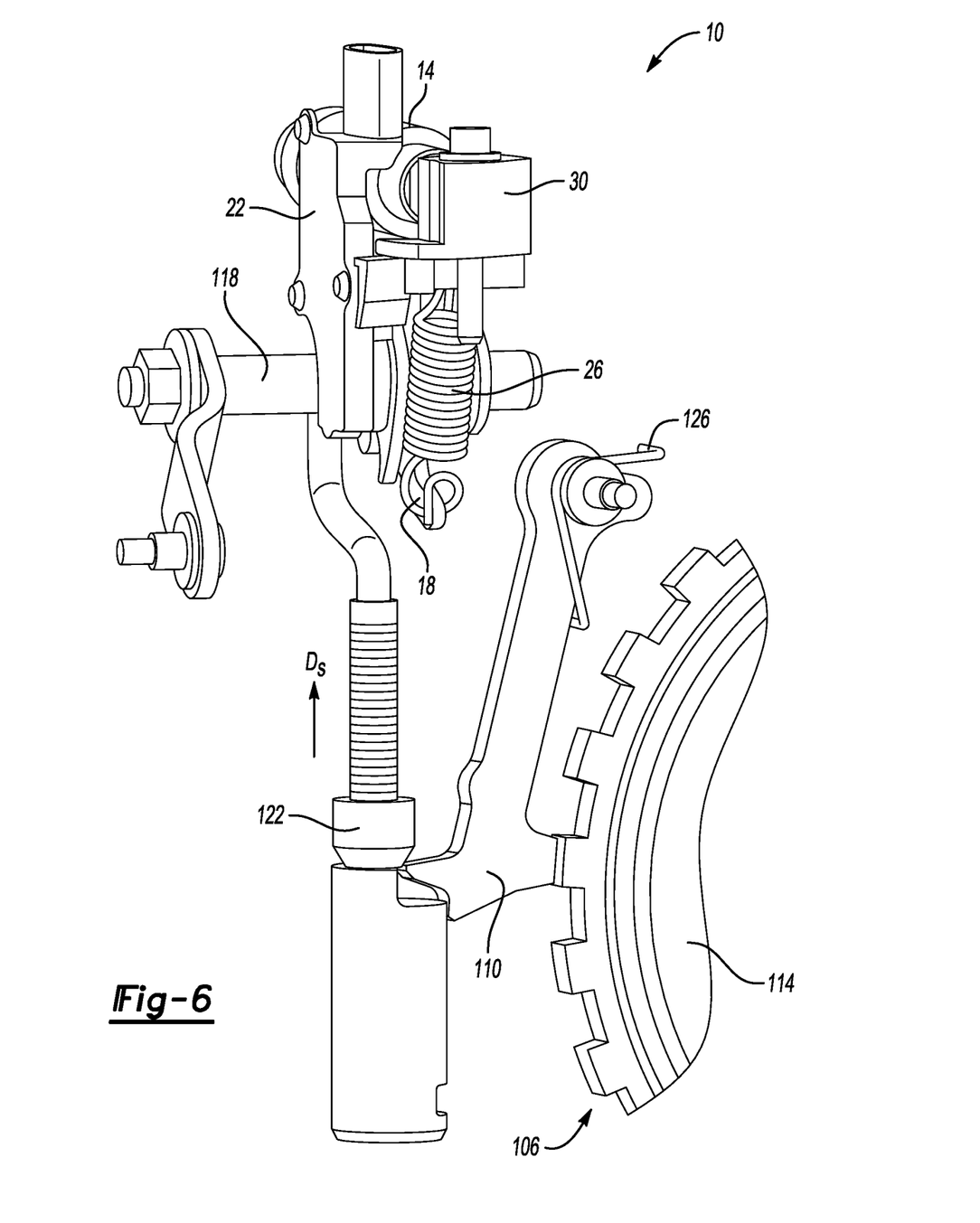
FIG. 6 illustrates another perspective view of selected portions of FIG. 5.

When the pawl 110 is disengaged from the gear 114 as shown in FIGS. 5 and 6, the pawl 110 does not restrict rotation of the gear 114. The axle 116 and the gear 114 are thus free to rotate without being restricted by the pawl 110. The transmission system 106 is in an OUT-OF-PARK position when the pawl 110 is disengaged from the gear 114. The OUT-OF-PARK position permits vehicle motion as the gear 114 is free to rotate relative to the pawl 110.

With reference again to FIG. 1 and continuing reference to FIGS. 3-6, the transmission system 106 is in the PARK position when the lever 18 is in the first position as shown in FIG. 1. Extending the park valve 14 in the direction $D_1$ to rotate the lever 18 in the direction $R_1$ transitions the transmission system 106 to the OUT-OF-PARK position.

Generally, rotating the lever 18 from the first position in the direction $R_1$ pulls a linkage 118, which cause a stopper 122 to withdraw in a direction $D_S$ from the position shown in FIGS. 3 and 4 to the position shown in FIGS. 5 and 6.

When the stopper 122 is in the position of FIGS. 5 and 6, there is clearance for a pawl biasing device 126 to pivot the pawl 110 from the engaged position of FIGS. 3 and 4 to the disengaged positions of FIGS. 5 and 6. Thus, extending the park valve 14 in the direction $D_1$ transitions the transmission system 106 from the PARK position to the OUT-OF-PARK position.

Sufficient retraction of the park valve 14 in the direction $D_2$ permits the lever 18 to rotate back to the first position. This rotation back to the first position transitions the transmission system 106 to transition from the OUT-OF-PARK position to the PARK position.

More specifically, when the park valve 14 is retracted in the direction $D_2$, the park valve 14, the biasing device 26, or both, can rotate the lever 18 in a direction opposite the direction $R_1$ without the rotation being blocked by the park valve 14. The rotation of the lever 18 in the direction opposite the direction $R_1$ causes the linkage 118 to move in a direction opposite the direction $D_S$, which moves the stopper 122 into the position of FIGS. 3 and 4. Moving the stopper 122 from the position of FIGS. 5 and 6 to the position of FIGS. 3 and 4 forces the pawl 110 to pivot into an engaged position with the gear 114. The force applied to the pawl 110 by the stopper 122 is sufficient to overcome the biasing force of the pawl biasing device 126.

With reference again to FIG. 1, the vehicle park lock assembly 10 can transition the transmission system 106 back and forth between the PARK position and the OUT-OF-PARK position in response to communications from the control unit 50.

An exemplary embodiment of such communications begins with the transmission system 106 in a PARK position. The control unit 50 then receives an input from a user that transitioning to an OUT-OF-PARK position is desired. The input could be a driver of the vehicle selecting a drive gear for the associated vehicle.

In response to the input, the control unit 50 sends a communication to the actuator 34. The communication can be an electrical signal that causes the actuator 34, here again, a hydraulic actuator, to extend the park valve 14. The sensor 22 then relays a signal back to the control unit 50 confirming that the park valve 14 has rotated the lever 18 to the second position where the transmission system 106 is disengaged. This information could optionally be communicated to the user.

Some features of the disclosed embodiment can include a support block that provides multiple functions within a vehicle park lock assembly. One exemplary function provided by the support block is to limit movement of the park valve. Another function of the support block is to provide a reaction point for a biasing device that biases the park lock assembly to a first position corresponding to a PARK position for the transmission system. Yet another function of the support block is to help to restrain and solidify positioning of the sensor.

Utilizing a singular support block to provide multiple functions can reduce weight, improve fuel economy, and reduce cost. Further, providing multiple functions with the support block can provide packaging advantages due to a smaller packaging envelope being required.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle park lock assembly, comprising:
a park valve that moves in a first direction to transition a lever from a first to a second position, and moves in an opposite, second direction to permit movement of the lever from the second to the first position;
a support block that limits movement of the park valve in the first direction;
a biasing device coupled to the support block and the park valve, the biasing device biasing the park valve to the first position; and
a sensor restrained by the support block.

2. The vehicle park lock assembly of claim 1, wherein the support block is secured directly to a transmission case.

3. The vehicle park lock assembly of claim 1, wherein the sensor is configured to sense whether the lever is in the first or the second position.

4. The vehicle park lock assembly of claim 3, wherein the sensor is a transmission range sensor.

5. The vehicle park lock assembly of claim 1, wherein transitioning the lever from the first to the second position causes a transmission system to transition from a PARK position to an OUT-OF-PARK position.

6. The vehicle park lock assembly of claim 5, wherein transitioning the lever from the second to the first position causes a transmission system to transition from the OUT-OF-PARK position to the PARK position.

7. The vehicle park lock assembly of claim 6, wherein the transmission system includes a pawl that is engaged with a gear to restrict vehicle motion when the transmission system is in the PARK position, the pawl disengaged from the gear to permit vehicle motion when the transmission system is in the OUT-OF-PARK position.

8. A vehicle park lock assembly, comprising:
a park valve that moves in a first direction to transition a lever from a first to a second position, and moves in an opposite, second direction to permit movement of the lever from the second to the first position;
a support block that limits movement of the park valve in the first direction and a biasing device coupled to the support block and the park valve, the biasing device biasing the park valve to the first position;
a sensor coupled directly to the support block, the sensor configured to sense whether the lever is in the first or the second position, wherein the support block is secured directly to a transmission component,
wherein transitioning the lever from the first to the second position causes a transmission system to transition from a PARK position to an OUT-OF-PARK position,
wherein transitioning the lever from the second to the first position causes a transmission system to transition from the OUT-OF-PARK position to the PARK position,
wherein the transmission system includes a pawl that is engaged with a gear to restrict vehicle motion when the transmission system is in the PARK position, the pawl disengaged from the gear to permit vehicle motion when the transmission system is in the OUT-OF-PARK position.

9. The vehicle park lock assembly of claim 8, wherein the support block provides a reaction point for the biasing device.

10. The vehicle park lock assembly of claim 9, wherein the biasing device is a spring having a first end portion directly coupled to the lever and an opposite, second end portion directly coupled to the support block.

11. A method of supporting components of a vehicle park lock assembly, comprising:
moving a park valve in a first direction to transition a lever from a first to a second position;
moving the park valve in an opposite, second direction to permit the lever to transition from the second to the first position;
biasing the park valve to the first position with a biasing device that is coupled to the lever and a support block;
limiting movement of the park valve in the first direction using the support block; and
restraining a sensor with the support block, the sensor sensing whether the lever is in the first or the second position.

12. The method of claim 11, further comprising extending the park valve in the first direction to rotate the lever from the first to the second position, and retracting the park valve in the second direction to permit the lever to rotate from the second to the first position.

13. The method of claim 12, further comprising rotating the lever from the second position to the first position using the park valve, the biasing device, or both.

14. The method of claim 12, wherein the support block restricts extending of the park valve when limiting movement of the park valve in the first direction.

15. The method of claim 11, further comprising directly attaching the support block to a transmission component.

16. The method of claim 11, wherein the biasing device is a spring having a first end portion coupled to the lever and an opposite, second end portion coupled to the support block, the support block providing a reaction point for the spring.

17. The method of claim 11, further comprising transitioning the lever from the first to the second position to move a transmission system from a PARK position to an OUT-OF-PARK position, and transitioning the lever from the second to the first position to move the transmission system from the OUT-OF-PARK position to the PARK position.

18. The method of claim 17, wherein the transmission system includes a pawl that is engaged with a gear to restrict vehicle motion when the transmission system is in the PARK position, the pawl disengaged from the gear to permit vehicle motion when the transmission system is in the OUT-OF-PARK position.

* * * * *